UNITED STATES PATENT OFFICE.

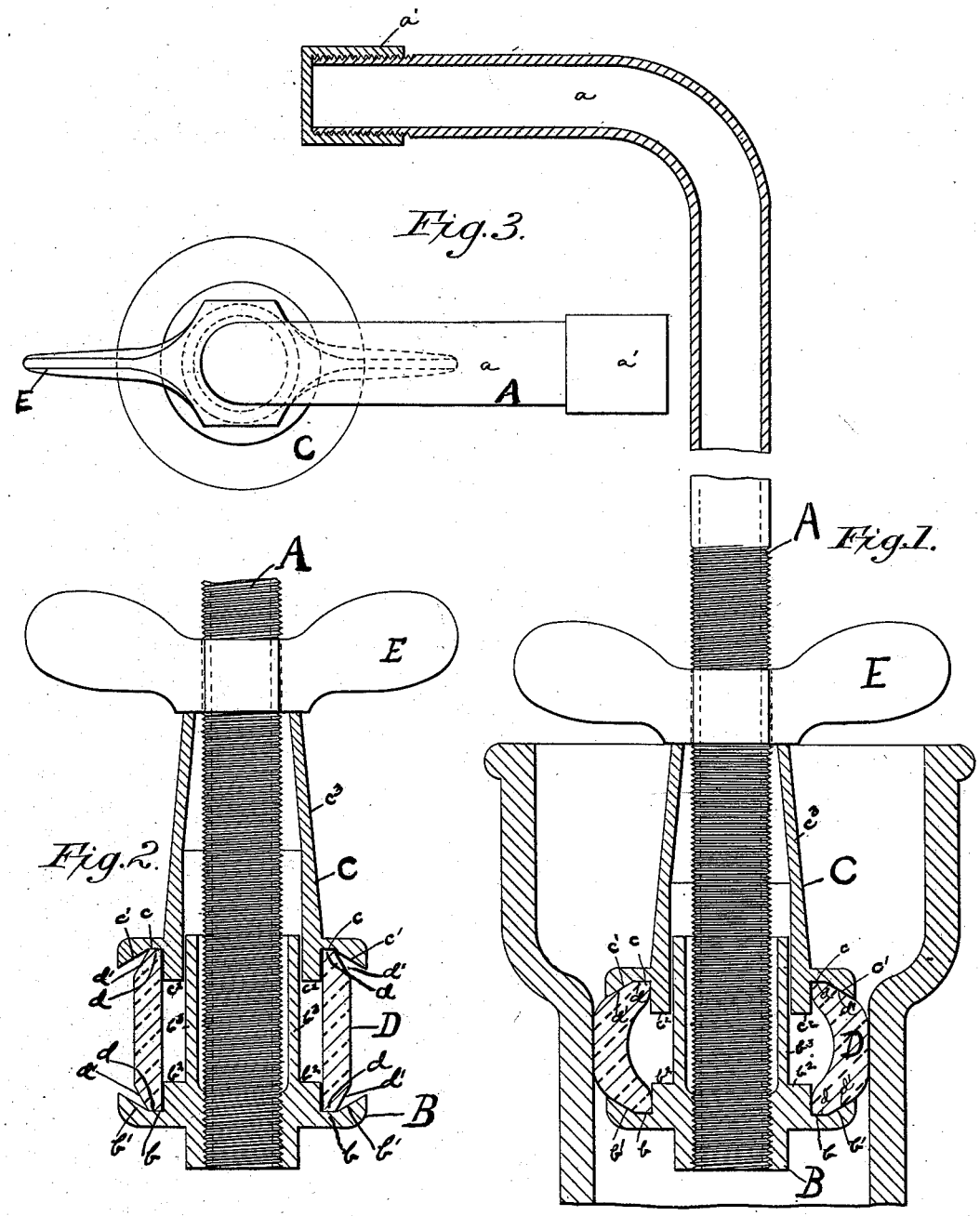

CLARENCE M. KEMP, OF BALTIMORE, MARYLAND.

EXPANDING PLUG FOR CLOSING PIPES, &c.

SPECIFICATION forming part of Letters Patent No. 402,600, dated May 7, 1889.

Application filed January 16, 1889. Serial No. 296,566. (No model.)

*To all whom it may concern:*

Be it known that I, CLARENCE M. KEMP, a citizen of the United States, residing at Baltimore, in the State of Maryland, have invented certain new and useful Improvements in Expanding Plugs for Closing Pipes, &c., of which the following is a specification.

The description following and the accompanying drawings enable any one skilled in the art to make and use my invention.

My invention relates to new and useful improvements in plugs for closing the outlets of a system of sewer or soil pipes, or for closing the ends of ordinary pipes, in order that a suitable test may be applied to ascertain if the pipes or the system of pipes whereon these plugs are applied for the purpose are tight.

My invention consists in the specific construction and combination of parts, as will be described.

In the accompanying drawings, Figure 2 is a vertical sectional view of the plug withdrawn from the pipe. Fig. 1 is a vertical sectional view of the plug closing the pipe. Fig. 3 is a top view of the plug.

Similar letters of reference indicate corresponding parts.

A is an ordinary pipe, capped at one end, $a'$, and having the other end threaded a considerable distance. On this is placed a thumb-nut, E, threaded to correspond with thread on the pipe.

C is an elongated washer, cored or hollow inside, presenting a level surface on upper end, against which the nut E presses. The lower end of C spreads and forms into a projecting hub, $c^2$, at the base of which is a straight plain surface, $c$, which extends to a surface that flares downward at a slight angle. (Shown at $c'$.)

B is another washer, threaded at its lower portion and screwed tightly on the end of pipe A. B is placed opposite C and has parts $b$, $b'$, and $b^2$ to correspond with parts $c$, $c'$, and $c^2$ thereon. B is provided with an elongated cylinder, $b^3$, which is guided by and passes freely into lower part of washer C.

D is a cylinder, of rubber, having a portion of its upper and lower ends, $d$, to present a flat surface, or, in other words, a surface at right angles to the inner surface of the rubber, and the remaining portion of the ends $d'$ steeply slope from the straight portion $d$. (See Fig. 2.)

To place the plug the operation is as follows: Catch the plug with one hand at the bent end of pipe at $a$; insert the plug part into the opening to be closed, here shown to be a hub end of ordinary soil-pipes; turn the thumb-nut E, which, moving freely against washer C, presses it downward, according to the pitch of the threads and the number of revolutions given nut E. While this is being done washer B remains immovable, as it has been tightly fastened to pipe A, as previously described; but the washer C, when pressed slightly downward toward washer B, engages lightly against the flat portion $d$ of the rubber cylinder, causing also the opposite and corresponding part of said cylinder to engage lightly against the portion $b$ of washer B. The rubber thus compressed between the two washers expands or bulges in the line of least resistance, which is found to be outward. As the compression increases by further revolution of the nut E, the rubber bulges further, whereupon the flaring portions $c'$ and $b'$ of the washers C and B engage the slanting parts $d'$ of rubber cylinder, by which means the washers take a stronger and wider bite against the rubber cylinder, and at the same time lock the ends of the rubber cylinder into the washers, so that the rubber cylinder has no opportunity at its ends to curl downward and slip under, whereby to get relief from the compression. Continuing the compression soon compels the rubber to touch the sides of the pipe within which the plug has been placed, and still further compression has so arched and locked the rubber between the three bodies of resistance comprising the two washers and the surrounding walls of the pipe, thus securing an air-tight joint.

The washer C is elongated, so that the rubber portion can be thrust down below the hubs of the pipe or beyond the hubs or bells of fittings, and the nut for operating will be outside the pipe, easy to reach and actuate. The inner cylinder portion, $b^3$, of washer B is guided into and by the hollow part of washer C, thus causing the two washers to be drawn truly toward each other and to squarely engage the contained rubber cylinder, by which method of construction it is made so compact and strong as to prevent any shock or blow given to the handle of the plug or to either washer from separating or displacing any one part from its properly-adjusted position to the other parts. Any suitable test can then be applied to the pipes by having the other openings also closed. By removing cap $a'$ from pipe A and attaching a valve a ready means of charging the pipes with compressed air is afforded.

Having thus described my invention, I claim as new and desire to secure by Letters Patent—

The combination, in an expanding plug for closing pipes, of washer C, with its projecting shoulder $c^2$, flat part $c$, and flaring part $c'$, and washer B, with projecting shoulder $b^2$, flat part $b$, and flaring part $b'$, with rubber cylinder D, with flat part of end $d$ and flaring part of end $d'$, as and for the purpose described.

CLARENCE M. KEMP.

Witnesses:
CHARLES E. KEMP,
W. ROBY PURNELL.